United States Patent [19]
Dutter

[11] Patent Number: 5,839,466
[45] Date of Patent: Nov. 24, 1998

[54] AUTOMATIC WATERING DEVICE

[76] Inventor: Marshall Dutter, Rte. 2, Box 100, Flora, Ind. 46929

[21] Appl. No.: 638,793

[22] Filed: Apr. 29, 1996

[51] Int. Cl.$^6$ .............................. F16K 31/34; F16K 51/00
[52] U.S. Cl. ............................... 137/414; 119/78; 119/80; 137/426; 137/428; 137/430
[58] Field of Search .................. 119/78, 80, 81; 137/414, 426, 430, 433, 442, 443, 444, 428

[56] References Cited

U.S. PATENT DOCUMENTS

| | | | |
|---|---|---|---|
| 1,193,683 | 8/1916 | Glanz, Jr. | 137/433 |
| 1,290,883 | 1/1919 | Blanning | 137/426 |
| 1,470,213 | 10/1923 | Black | 137/433 |
| 1,508,903 | 9/1924 | Strandt | 137/433 |
| 1,737,529 | 11/1929 | Viele | 137/433 |
| 2,817,355 | 12/1957 | Goff | 137/408 |
| 2,821,167 | 1/1958 | Gilbertson | 119/80 |
| 2,821,994 | 2/1958 | Richards | 137/433 |
| 2,940,467 | 6/1960 | Smith | 137/433 |
| 3,108,573 | 10/1963 | Ashby | 119/81 |
| 3,145,728 | 8/1964 | Sterrett et al. | 137/414 |
| 3,194,258 | 7/1965 | Grant | 137/414 |
| 3,307,522 | 3/1967 | Far | 119/81 |
| 3,650,247 | 3/1972 | McKinstry | 119/81 |
| 3,834,365 | 9/1974 | Ussery | 137/426 |
| 3,893,475 | 7/1975 | Hudson | 137/433 |
| 4,013,091 | 3/1977 | Hudson | 137/414 |
| 4,192,257 | 3/1980 | Urzi | 119/81 |
| 4,258,746 | 3/1981 | Hudson | 137/433 |
| 4,735,230 | 4/1988 | Detloff | 137/426 |
| 5,235,999 | 8/1993 | Lindquist et al. | 137/433 |

*Primary Examiner*—George L. Walton
*Attorney, Agent, or Firm*—Beck, Michael & Beck, P.C.

[57] ABSTRACT

An automatic watering device for use with a stationary water reservoir includes an elongated hollow housing fixedly positioned relative to the reservoir, an elongated pipe having a first end extending into the housing and an opposite second end connected to a source of water, and a water control valve disposed within the housing and connected to the first end of the pipe. The water control valve is adjustably positionable within the housing to correspondingly set a desired water level within the reservoir. The automatic watering device of the present invention is particularly useful for maintaining a supply of water in an animal watering trough since the water control valve is protected from abuse at all times by the protective housing.

15 Claims, 6 Drawing Sheets

AUTOMATIC WATERING DEVICE

FIELD OF THE INVENTION

The present invention relates generally to devices for regulating the level of liquid in a reservoir, and more specifically to such devices for automatically maintaining a desired water level in an animal watering reservoir.

BACKGROUND OF THE INVENTION

In accordance with modern farming techniques, many varieties of livestock are raised and maintained entirely in livestock confinement buildings. In order to maximize the usable area of such buildings for animal quarters, the area required by livestock maintenance personnel should correspondingly be minimized. It is therefore desirable to automate, to the extent possible, the various animal maintenance tasks such as waste removal, feeding, watering, etc.

Automated animal watering devices are known and generally fall into three categories. A first category is exemplified by U.S. Pat. No. 3,650,247 to McKinstry which discloses an automatic watering device which is integral with the water reservoir. A second category is exemplified by U.S. Pat. Nos. 2,817,355 to Goff, 3,108,573 to Ashby, 3,307,522 to Far and 4,192,257 to Urzi. These patents disclose automatic watering devices operably attached to the water reservoir in that the water reservoir is required to be movable with respect to the control valve. In general, the weight of the water entering the reservoir causes the reservoir to move away from the valve, which eventually causes the valve to shut off the water supply when a predetermined water level in the reservoir is reached. A third category is exemplified by U.S. Pat. No. 4,013,091 to Hudson which discloses a water control valve detachably mountable to an ordinary water spigot. The valve must be rigidly secured relative to the reservoir and is operable to maintain a predetermined water level in the reservoir corresponding to the positioning of the valve.

The foregoing animal watering devices, while they may be widely used, suffer from several inherent drawbacks. First, the water control valves are typically exposed and can therefore easily be damaged or ruined by animal contact. Second, setting of a desired reservoir water level often requires complicated adjustment of the control valve and/or other structure. Further, several of the prior art watering devices are unduly complicated in operation and expensive to purchase and/or build. Moreover, due to the complexity of such devices, most are inherently unreliable and therefore often require maintenance.

What is therefore needed is a simple and inexpensive automatic watering device wherein the water control valve is protected from animal abuse. Such a device should ideally be constructed of few, and simple, parts so that it is inherently reliable and does not often require maintenance. In operation, such a device should further permit quick and easy setting of any desirable water level in the water reservoir.

SUMMARY OF THE INVENTION

The foregoing shortcomings of known prior art automatic watering devices are addressed by the present invention. In accordance with one aspect of the present invention, an automatic watering device comprises an elongated hollow housing, an elongated hollow pipe having a first end extending into the housing and an opposite second end connectable to a source of liquid, and a liquid control valve having an input port connected to the first end of the pipe and an opposite outlet port. The control valve is disposed within the housing and is responsive to pressure acting against the outlet port to inhibit flow of liquid therethrough and otherwise permits liquid to flow from the pipe through the outlet port.

In accordance with another aspect of the present invention, an automatic watering device comprises an elongated hollow housing defining an open end, an elongated hollow pipe having a first end extending into the housing and an opposite second end connectable to a source of liquid, a liquid control valve connected to the first end of the pipe within the housing and operable to control a flow of the liquid therethrough, and means for adjustably positioning the control valve relative to the open end of the housing.

In accordance with a further aspect of the present invention, a combination includes a reservoir and an automatic watering device. The automatic watering device comprises an elongated hollow housing fixedly positioned relative to the reservoir and having a first end extending into the reservoir, an elongated hollow pipe having a first end extending into the housing and an opposite second end connected to a source of liquid, and a liquid control valve having an input port connected to the first end of the pipe and an opposite outlet port. The control valve is disposed within the housing and is responsive to a level of liquid within the reservoir to inhibit liquid flow therethrough, and otherwise permits liquid from the source of liquid to flow from the outlet port into the reservoir, the device thereby maintaining the level of liquid within the reservoir.

One object of the present invention is to provide an automatic watering device having a water control valve disposed within a protective housing.

Another object of the present invention is to provide such an automatic watering device for use with a reservoir wherein the water level within the reservoir may easily be adjusted.

Yet another object of the present invention is to provide an automatic watering device that is inexpensive to manufacture and is inherently reliable in operation.

These and other objects of the present invention will become more apparent from the following description of the preferred embodiment.

DESCRIPTION OF THE PREFERRED EMBODIMENT

Figure 1A:
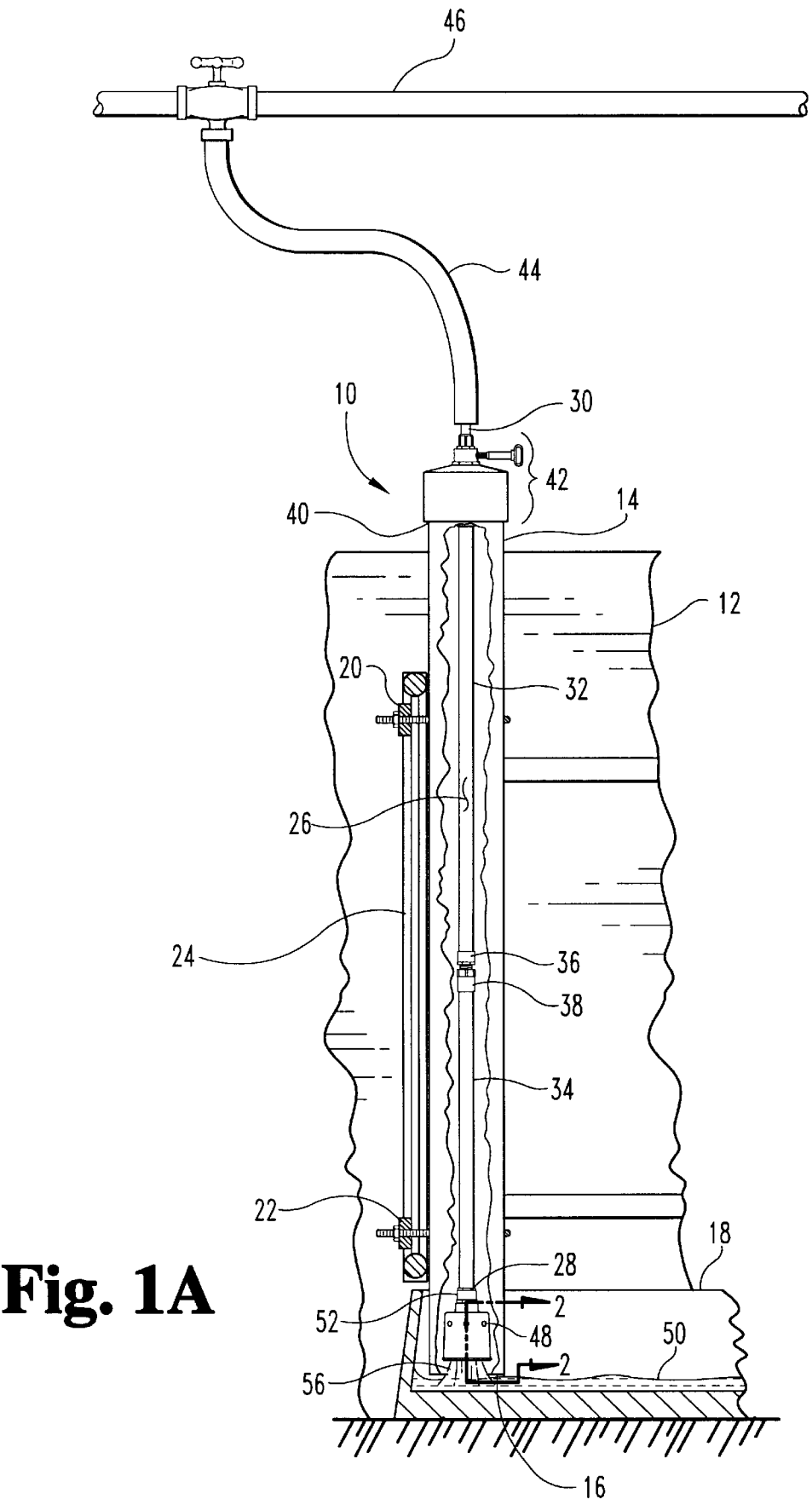
FIG. 1A is a partial cutaway front elevational view of one embodiment of the automatic watering device of the present invention shown in use with a watering reservoir and associated water supply.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1A, a preferred embodiment of an automatic watering device 10, in accordance with the present invention, is shown. Device 10 is shown, and will be described, in a preferred use as an automatic animal watering device in an animal confinement building 12. It is to be understood, however, that the present invention as described hereinafter, may be used to maintain a desired level of liquid in any liquid reservoir.

Automatic watering device 10 includes an elongated hollow housing 14 having a first end 16 extending into a reservoir 18. As shown throughout the figures, reservoir 18 is represented as an animal watering trough, although the present invention contemplates that reservoir 18 may be any reservoir in which a desired liquid level is to be maintained. In accordance with one aspect of the present invention, housing 14 is fixedly secured relative to reservoir 18. Preferably, housing 14 is clamped, via clamps 20 and 22, to a rigid structure 24 forming part of the confinement building 12. However, housing 14 may alternatively be secured to reservoir 18 or to some other rigid structure. It is to be understood that the importance of securing housing 24 lies not in the particular structure to which it is secured, but rather that it is fixedly positioned relative to reservoir 18.

An elongated hollow pipe 26 has a first end 28 extending into hollow housing 14. Preferably, housing 14 and pipe 26 are each circular and cross-section with the outer circumference of pipe 26 sized smaller than the inner circumference of housing 14, so that pipe 26 may be freely advanced into, and retracted from, housing 14. It is to be understood, however, that the present invention contemplates that housing 14 and pipe 26 may have any desired shape as long as the inner surface of housing 14 defines a first cross-sectional area, and the outer surface of pipe 26 defines a second reduced cross-sectional area so that pipe 26 is longitudinally moveable within housing 14.

Often times, watering device 10 is assembled within confinement building 12 which may have a restricted ceiling height (not shown). For this purpose, pipe 26 may be provided as separate pipes 32 and 34 which may be attached at couplings 36 and 38 respectively attached thereto. In another embodiment, pipe 26 is of unitary construction. In either case, a second end 30 of pipe 26, opposite end 28, extends out of end 40 of housing 14. A top cap assembly 42 is affixed to end 40 of housing 14, and a conduit 44, such as a flexible hose, connects end 30 of pipe 26 to a source of liquid 46. Preferably, liquid source 46 is an ordinary pressurized water line, and conduit 44 is comprised of suitable flexible tubing, such as, for example, a known garden hose.

A liquid control valve 48, operable to control the flow of liquid from liquid source 46 through pipe 26, is attached to end 28 of pipe 26. Preferably, a coupling member 52 having a threaded portion 54 extending therefrom (see FIG. 3B) is attached to end 28 of pipe 26 for threaded attachment to fluid control valve 48. However, the present invention contemplates that any other known valve attachment technique may be used to attach pipe 26 to valve 48.

Figure 1B:
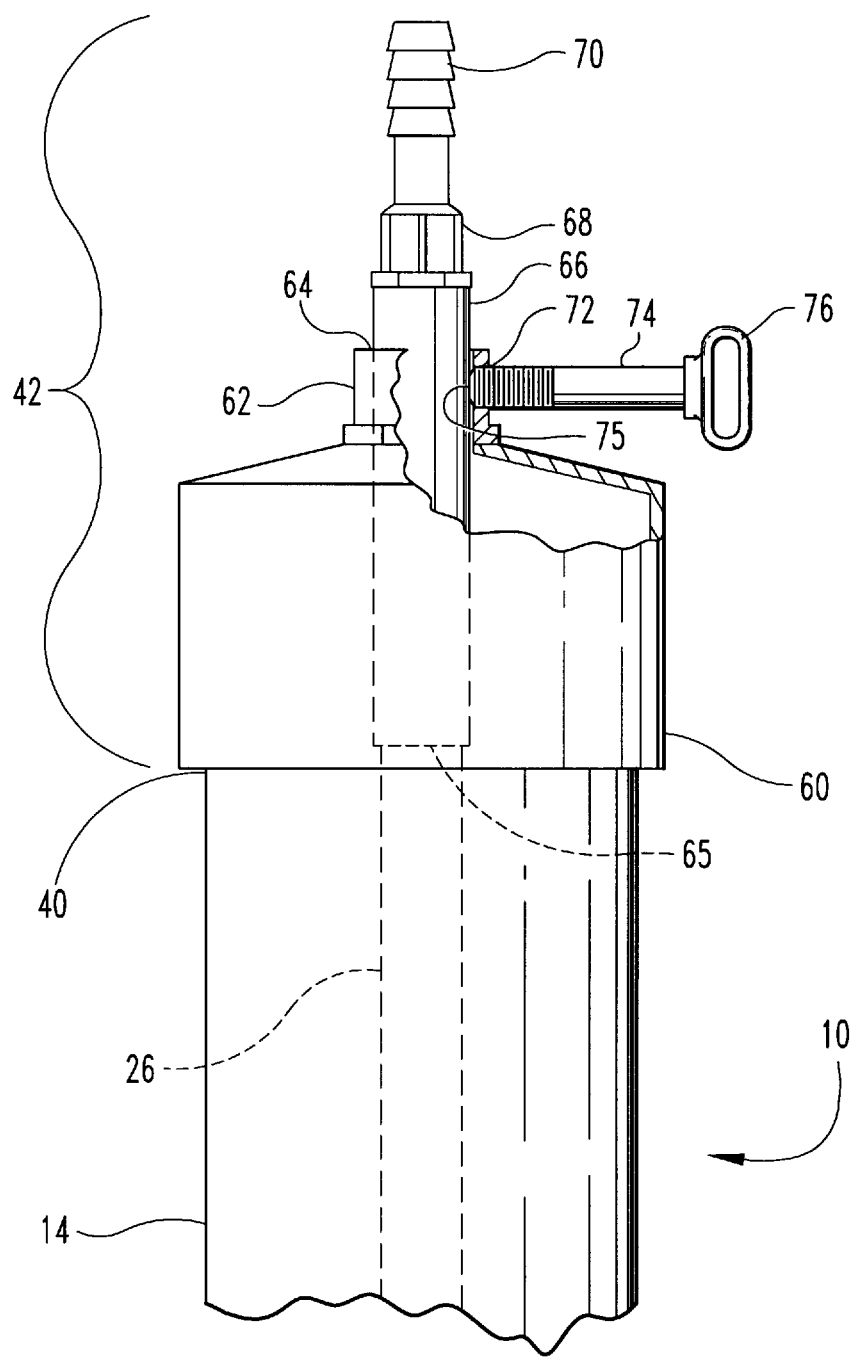
FIG. 1B is a partial cutaway magnified view of the top portion of the watering device of FIG. 1A.

Referring now to FIG. 1B, a preferred embodiment of top cap assembly 42 will now be discussed in detail. Preferably, an end cap 60 is secured to end 40 of housing 14, through which a hollow collar 62 is attached. Collar 62 defines a bore 64 therethrough into housing 14, which is preferably sized slightly larger than a hollow adapter pipe 66 secured to an end 65 of pipe 26. A flexible tubing connector 70, preferably nylon, is secured to pipe 66 via bushing 68. As it relates to FIG. 1A, the tip of flexible tubing insert 70 corresponds to the second end 30 of pipe 26.

A bore 72 is defined through collar 62, through which a fixation member 74 extends. Preferably, fixation member 74 includes a chain-link 76, or similar structure, attached thereto to facilitate actuation of fixation member 74. Preferably, bore 72 is threaded, as is fixation member 74, such that fixation member 74 may be threadingly advanced therethrough until tip 75 of fixation member 74 engages pipe 66. Further advancement of fixation member 74 into bore 72 causes tip 75 of fixation member 74 to force tube 66 against collar 62. In this manner, pipe 66, and consequently pipe 26 and fluid control valve 48, may be rigidly secured to housing 14. It is to be understood, however, that other known fixation means may be used to detachably secure the pipe 26 and fluid control valve 48 assembly to housing 14.

Referring again to FIG. 1A, it should now be apparent that housing 14 is fixedly secured relative to reservoir 18, and that the pipe 26 and fluid control valve 48 combination is detachably secured to housing 14. As will be described in greater detail hereinafter, fluid control valve 48 is responsive to fluid provided thereto by fluid source 46 to dispense fluid 56 into reservoir 18. Fluid control valve 48 is further responsive to a desired level 50 of liquid within reservoir 18 to inhibit flow of liquid therethrough.

Figure 2:
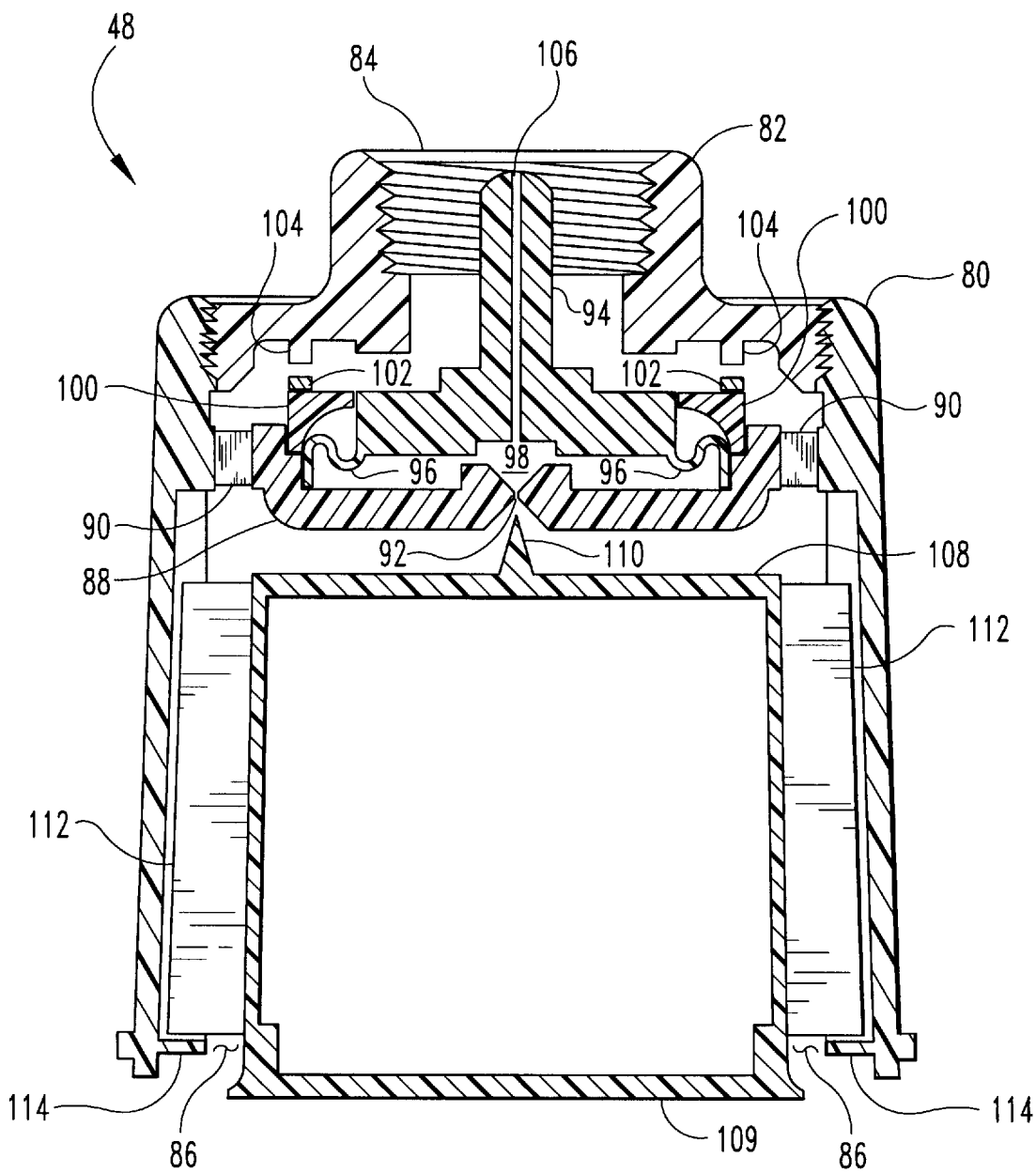
FIG. 2 is a cross-sectional view of a preferred embodiment of the water control valve of FIG. 1A, taken along section lines 2—2.

Referring now to FIG. 2, a cross-section of a preferred embodiment of fluid control valve 48 is shown. Valve 48 includes a hollow housing 80 to which an input port member 82 is threadingly engaged. Member 82 defines a threaded input port 84 therethrough. Housing 80 further defines an outlet port 86 adjacent an opposite end thereof. A first valve member 88 is secured to an inner surface of housing 80 via a number of tabs 90. First valve member 88 defines a control chamber outlet port 92 approximately centrally therethrough. A second valve member 94 is attached to first member 88 via diaphragm 96. An annular ring 100 is positioned above diaphragm 96, and defines an annular sealing member 102 thereon. A similarly configured sealing surface 104 extends from member of housing 80. Second valve member 94 defines a control chamber inlet port 106 approximately centrally therethrough, which aligns with control chamber outlet port 92. A control chamber 98 is defined between first valve member 88 and second valve member 94, and has an expandable volume as will be discussed in greater detail hereinafter.

A float member 108 is slidably disposed between first valve member 88 and outlet port 86. Float 108 defines a lower float surface 109 adjacent outlet port 86, and a plug 110 approximately centrally located on an opposite top surface. Plug 110 is aligned with control chamber outlet port 92. A number of flanges 112 extend laterally from float 108 and abut a rim 114 extending from housing 80 to thereby maintain float 108 within valve housing 80.

Figures 3A, 3B:
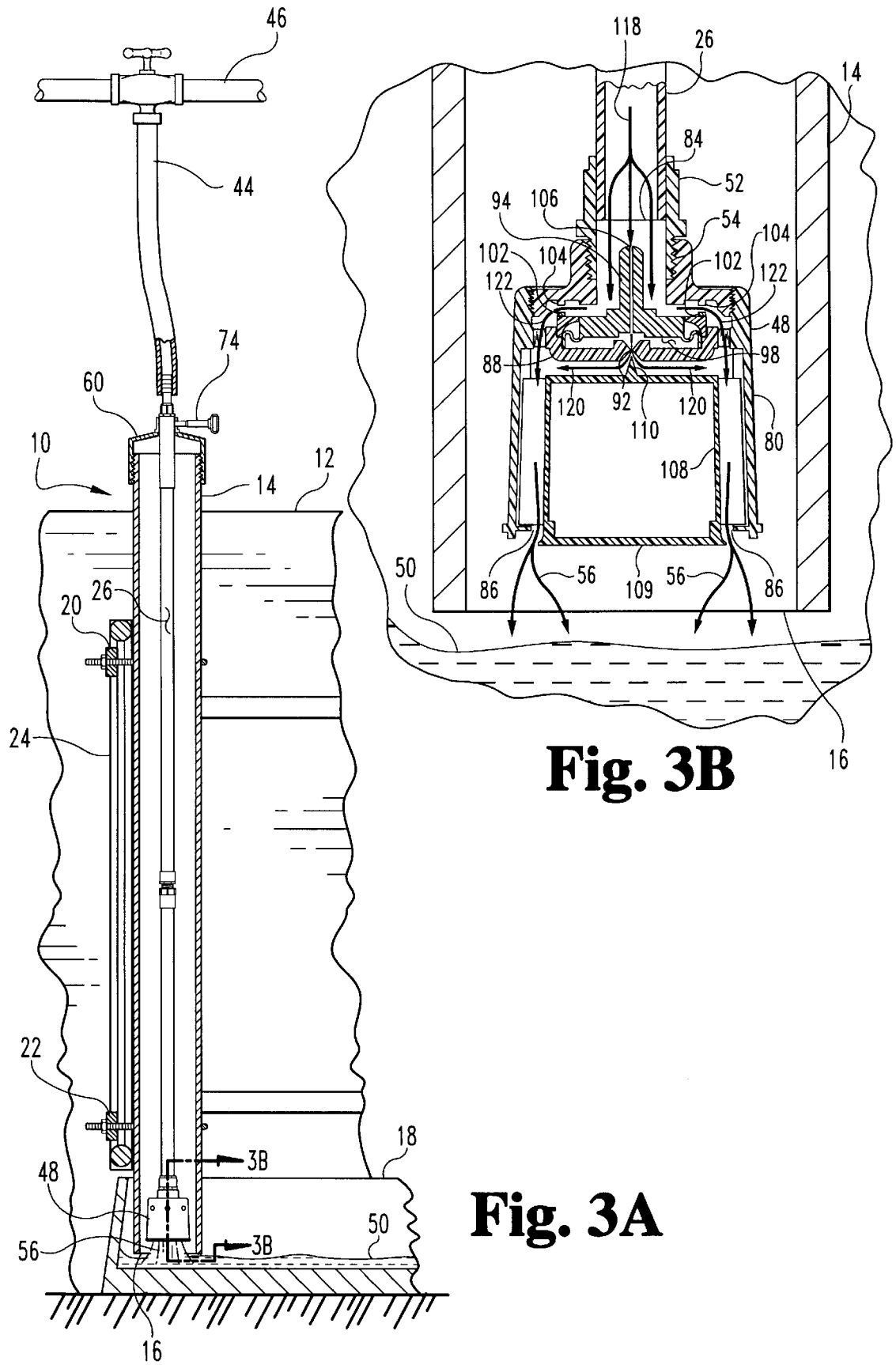
FIG. 3A is a partial cross-sectional view of the automatic watering device of FIG. 1A shown dispensing water into a reservoir.
FIG. 3B is a magnified cross-sectional view of the water control valve of FIG. 3A taken along section lines 3B—3B.

With the aid of FIGS. 3A–3D, the operation of automatic watering device 10 in maintaining a desired level of liquid in reservoir 18 will now be described in detail. Referring specifically to FIGS. 3A and 3B, liquid is provided by liquid source 46, preferably a water line, and travels through conduit 44 into pipe 26. Housing 14 is rigidly secured relative to reservoir 18, and the pipe 26 and liquid control valve 48 combination is adjustably secured to housing 14. As will be discussed in greater detail hereinafter, the pipe 26 and liquid control valve 48 combination may be adjustably positioned relative to housing 14, via fixation member 74, to thereby set a desired level of liquid within reservoir 18.

Referring now specifically to FIG. 3B, liquid supplied to pipe 26 by liquid source 46 flows into inlet port 84 of liquid control valve 48. As shown by liquid flow lines 118, liquid entering liquid control valve 48 flow into control chamber inlet port 106 and around second valve member 94. If the liquid level 50 within reservoir 18 is below lower surface 109 of float 108 as shown in FIG. 3B, float 108 will be forced away from first valve member 88 by the action of gravity. This causes float plug 110 of float 108 to be drawn away from control chamber outlet port 92 so that liquid entering control chamber inlet port 106 flows through control chamber 98 and out of control chamber outlet port 92 as shown, by flow arrows 120. The flow of liquid from control chamber outlet port 92 bears against float 108 and further assists in urging float plug 110 away from control chamber outlet port 92.

Under such conditions, liquid flowing around second valve member 94, as shown by flow arrows 118, urges sealing member 102 away from sealing surface 104 of housing 80 so that liquid may flow thereby, as shown by flow arrows 122. The combination of liquid, represented by flow arrows 120 and 122, is dispensed from liquid control valve outlet port 86 and into reservoir 18 as shown by flow arrows 56. As long as the level of liquid 50 within reservoir 18 is below the lower surface 109 of float 108, liquid control valve 48 permits liquid from pipe 26 to be dispensed therein as described.

Figures 3C, 3D:
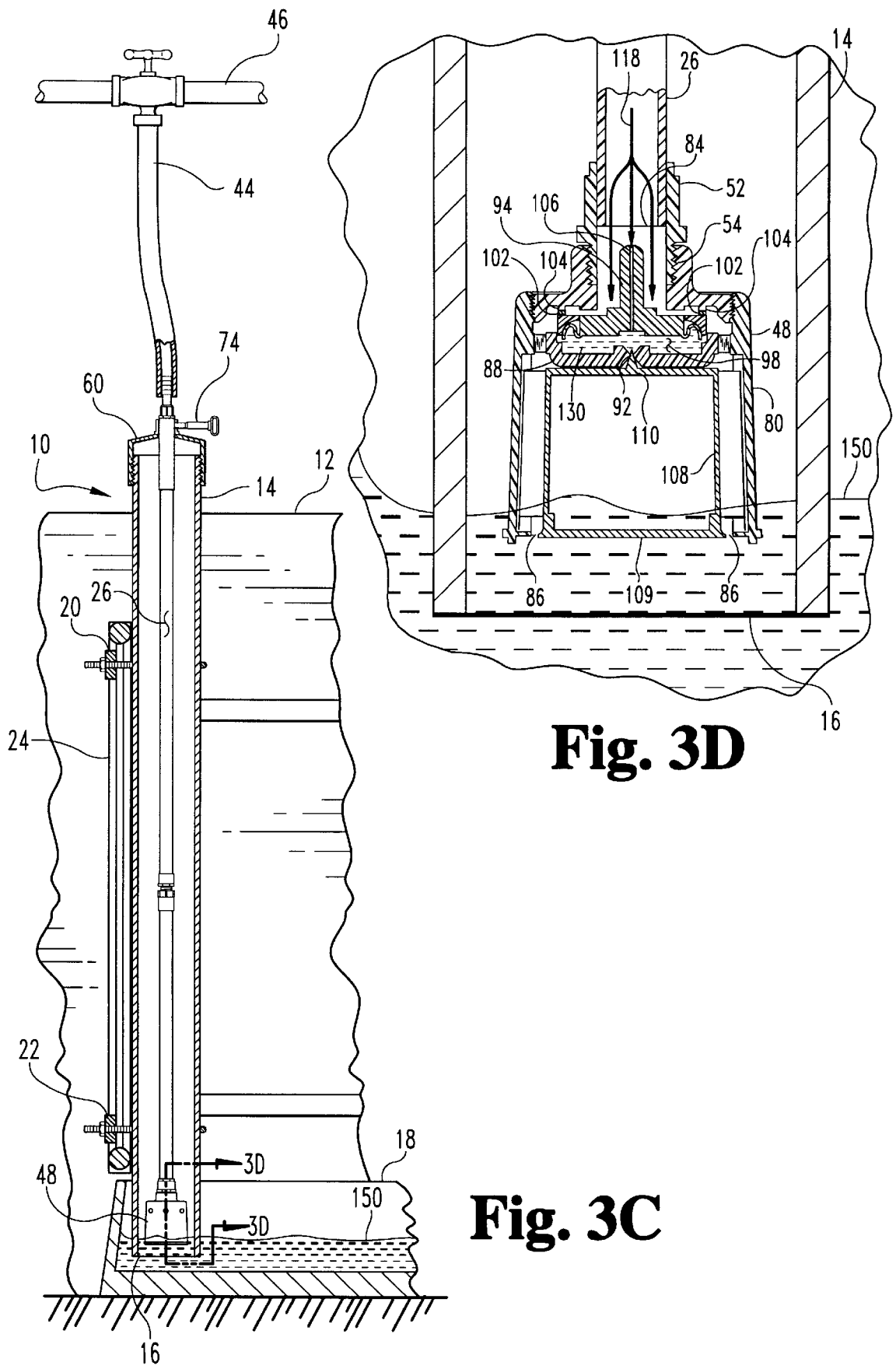
FIG. 3C is a partial cross-sectional view of the automatic watering device of FIG. 1A shown inhibiting water flow therethrough.
FIG. 3D is a magnified cross-sectional view of the water control valve of FIG. 3C taken along section lines 3D—3D.

Referring now to FIGS. 3C and 3D, automatic watering device 10 is shown as maintaining a desired water level 150 within reservoir 18. As previously described, liquid within pipe 26 flows into control chamber inlet port 106 and around second valve member 94 as shown by flow lines 118 of FIG. 3D. However, the upward pressure of the water level 150 within reservoir 18 acting upon the lower surface 109 of float 108 forces float 108 upwardly and eventually causes float plug 110 to be urged into sealing engagement with control chamber outlet port 92. As such, liquid entering control chamber inlet port 106 is collected in control chamber 98. As liquid continues to enter control chamber inlet port 106, the liquid level 130 within control chamber 98 urges second valve member 94 away from first valve member 88, thereby expanding the volume of control chamber 98. As the volume of control chamber 98 sufficiently increases, sealing member 102 is urged into sealing contact with sealing surface 104 of housing 80, thereby inhibiting liquid flow therethrough. With sealing member 102 sealingly engaged with sealing surface 104 of housing 80, and float plug 110 sealingly engaged within control chamber outlet port 92, liquid control valve 48 effectively blocks the flow of liquid therethrough.

When the level of liquid within reservoir 18 is sufficiently decreased below level 150, typically through evaporation and/or consumption, upward pressure on the lower surface 109 of float 108 is correspondingly relieved, and float plug 110 is drawn away from control chamber outlet port 92 by the action of gravity and by the pressure of liquid within control chamber 98. Liquid within control chamber 98 may then escape through control chamber outlet port 92, and when the liquid level 130 within control chamber 98 sufficiently decreases, the pressure of liquid within pipe 26 forces second valve member 94 towards first valve member 88, thereby disengaging sealing member 102 from sealing surface 104, and permitting liquid flow thereby as previously described.

Figure 3E:
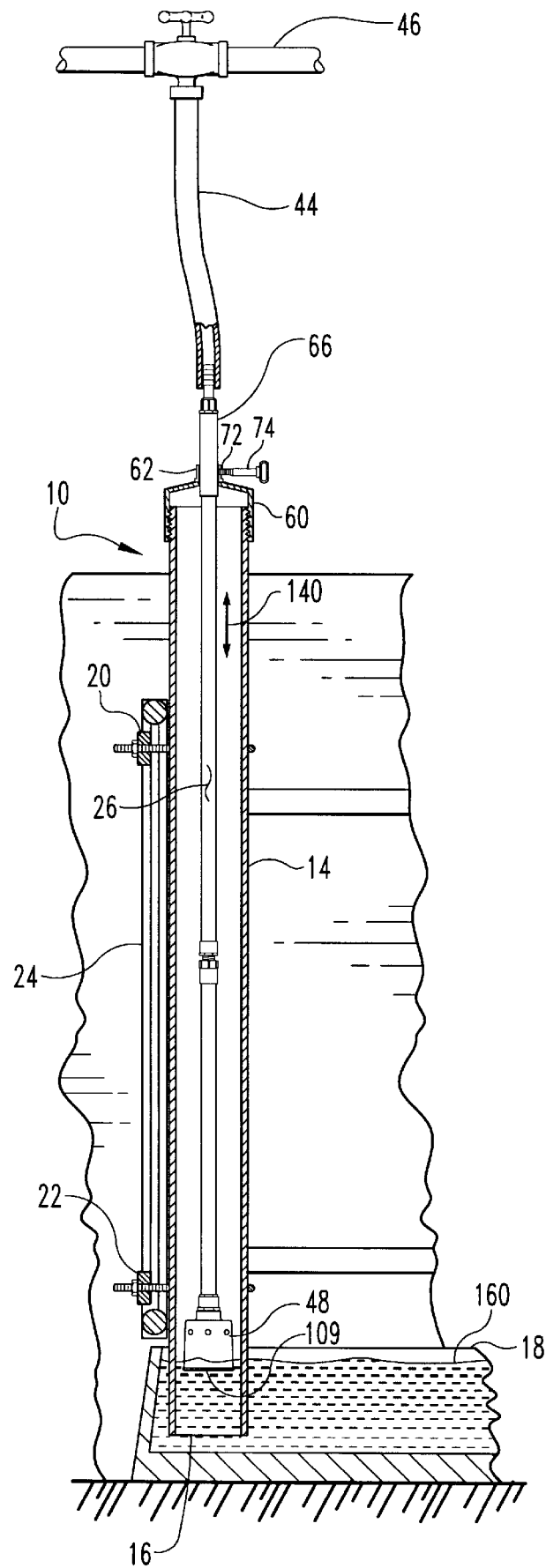
FIG. 3E is a partial cross-sectional view of the automatic watering device of FIG. 1A shown adjusted to increase the water level in the reservoir.

Referring now to FIG. 3E, the liquid level within reservoir 18 may be changed to any desired level 160 simply by repositioning liquid control valve 48 relative to housing 14. Preferably, this may be accomplished by loosening fixation member 74, and adjusting the vertical position of the pipe 26 and liquid control valve 48 combination relative to housing 14 as shown by bi-directional arrow 140. When liquid control valve 48 is suitably positioned to provide a desired liquid level 160 within reservoir 18, fastening member 74 is simply advanced into bore 72 until pipe 66 is secured against collar 62. Although the foregoing mechanism for adjustably positioning liquid control valve 48 to provide a desired liquid level 160 within reservoir 18 is preferable, it is to be understood that any other known mechanism can be used with the present invention to adjustably secure the pipe 26 and liquid control valve 48 combination relative to housing 14. With any such mechanism, liquid control valve 48 is preferably adjustably positionable relative to reservoir 18 to provide any desired liquid level therein while maintaining liquid control valve 48 protectively housed within housing 14.

With the exception of connector 70, fixation member 74 and liquid control valve 48, all other components of automatic watering device 10 are preferably constructed of SCH 40 PVC components. However, the present invention contemplates that such components may be constructed of other known durable materials, provided they can be assembled in a leak-proof manner and are not generally susceptible to rusting or corrosion, depending upon the type of liquid used. Moreover, connector 70 and fastening member 74 may be similarly constructed of other desired materials.

Preferably, liquid control valve 48 is that described in U.S. Pat. No. 4,013,091, which is available through Hudson Valve Company, Inc. of Bakersfield, Calif., and the contents of which patent are incorporated herein by reference. However, the present invention contemplates using any known liquid control valve operable to control liquid flow therethrough in a manner described herein. More specifically, any known liquid control valve 48 may be used which is responsive to liquid provided by liquid source 46 via pipe 26 to dispense the liquid into reservoir 18, and is further responsive to a level of liquid within reservoir 18 acting thereon to inhibit flow of liquid therethrough.

It should now be apparent that the automatic watering device 10 of the present invention may be used to provide an adjustable level of liquid within a reservoir 18, while the liquid control valve 48 is protected at all times within a housing 14. Such an automatic watering device 10 is particularly suited as an animal watering device for use in an animal confinement building 12, wherein the water level within an animal watering trough may be set at any desired level, while the water control valve is protected from animal abuse at all times. However, it is to be understood that the automatic watering device 10 of the present invention is not limited to such use, and that those skilled in the art will recognize other uses in which ease of adjustably of liquid level within a reservoir is desired while maintaining a protective housing about the liquid control valve.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An automatic watering device comprising:
    an elongated hollow housing defining an open end;
    an elongated hollow pipe slidably received within said housing, said pipe having a first end extending into said housing and an opposite second end connectable to a source of liquid;
    a liquid control valve including a float and having an inlet port connected to said first end of said pipe and an opposite outlet port, said control valve responsive to pressure acting against said float to inhibit flow of liquid therethrough and otherwise permitting liquid to flow from said pipe through said outlet port and through said open end of said housing; and
    means for securing said housing to said pipe at various locations along said pipe relative to said housing to thereby adjustably position said control valve within said housing adjacent said open end thereof.

2. The watering device of claim 1 wherein said housing defines an inner surface having a first cross-sectional area, and said pipe defines an outer surface having a second cross-sectional area smaller than said first cross-sectional area.

3. The watering device of claim 2 wherein said housing and said pipe are each substantially cylindrical tubes.

4. The watering device of claim 1 wherein said liquid control valve includes:
    a hollow housing defining said inlet port at one end thereof and said outlet port at an opposite end thereof; and
    a control chamber disposed within said control valve housing and defining a control chamber inlet port adjacent said control valve inlet port, an opposite control chamber outlet port, and a sealing member extending about said inlet ports, said control chamber having an expandable volume,
    said float defining a plug opposite said control chamber outlet port, said float responsive to pressure in a direction toward said control outlet port to force said plug into said control chamber outlet port such that liquid entering said control chamber inlet port expands the volume of said control chamber and forces said sealing member into sealing engagement with said control valve housing.

5. The watering device of claim 4 wherein said liquid control valve further includes:
    a first valve member juxtaposed with said float and secured to said control valve housing, said first valve member defining said control chamber outlet port therethrough; and
    a second valve member resiliently attached to said first valve member and defining said control chamber therebetween, said second valve member further defining said control chamber inlet port therethrough and said sealing member thereon.

6. An automatic watering device comprising:
    an elongated hollow housing defining an open end;
    an elongated hollow pipe having a first end extending into said housing and an opposite second end connectable to a source of liquid;
    a liquid control valve, including a float, connected to said first end of said pipe, said control valve and float disposed within said housing and operable to control a flow of the liquid therethrough; and
    a fixation member extending through said housing and engaging said pipe at various locations thereof to thereby adjustably position said control valve and said float relative to said open end of said housing.

7. The watering device of claim 6 wherein said fixation member is threaded, said fixation member threadingly engaging said housing and advanceable therethrough to secure said pipe against said housing.

8. The watering device of claim 6 further including a top cap attached to an end of said housing opposite said open end, said top cap defining a bore therethrough, said bore slidably receiving said pipe therethrough, said fixation member extending through said top cap and securing said pipe against said bore with a press fit.

9. The watering device of claim 6 wherein said housing and said pipe are each substantially cylindrical tubes.

10. The watering device of claim 6 wherein said liquid control valve has an input port connected to said first end of said pipe and an opposite outlet port, said control valve responsive to pressure acting against said float to inhibit flow of liquid through said outlet port and otherwise permitting liquid to flow from said pipe through said outlet port and through said open end of said housing.

11. In combination:
    a reservoir; and
    an automatic watering device, the automatic watering device comprising:
        an elongated hollow housing fixedly positioned relative to the reservoir and having a first open end extending into the reservoir;
        an elongated hollow pipe slidably received within said housing, said pipe having a first end extending into said housing and an opposite second end connected to a source of liquid;
        a liquid control valve including a float and having an inlet port connected to said first end of said pipe and an outlet port, said control valve responsive to a level of liquid within the reservoir acting against said float to inhibit liquid flow therethrough and otherwise permitting liquid from said source of liquid to flow from said outlet port into the reservoir, said device thereby maintaining said level of liquid within the reservoir; and
        means for securing said housing to said pipe at various locations along said pipe relative to said housing to thereby adjustably position said control valve within said housing adjacent said open end thereof.

12. The combination of claim 11 wherein said fixation member is threaded, said fixation member threadingly engaging said housing and advanceable therethrough to secure said pipe against said housing.

13. The combination of claim 12 further including a top cap attached to an end of said housing opposite said first end, said top cap defining a bore therethrough, said bore slidably receiving said pipe therethrough, said fixation member extending through said top cap and securing said pipe against said bore with a press fit.

14. The combination of claim 11 wherein said liquid control valve includes:
    a hollow housing defining said inlet port at one end thereof and said outlet port at an opposite end thereof; and
    a control chamber disposed within said control valve housing and defining a control chamber inlet port adjacent said control valve inlet port, an opposite control chamber outlet port, and a sealing member extending about said inlet ports, said control chamber having an expandable volume, said float defining a plug opposite said control chamber outlet port, said level within the reservoir forcing said float plug into said control chamber outlet port such that liquid entering said control chamber inlet port expands the volume of said control chamber and forces said sealing member into sealing engagement with said control valve housing to thereby inhibit flow of liquid from said control valve outlet port.

15. The combination of claim 11 wherein the reservoir is an animal watering trough;

and wherein said source of liquid is a pressurized water line.

* * * * *

UNITED STATES PATENT AND TRADEMARK OFFICE
CERTIFICATE OF CORRECTION

PATENT NO : 5,839,466
DATED : November 24, 1998
INVENTOR(S) : Marshall Dutter

It is certified that error appears in the above-identified patent and that said Letters Patent is hereby corrected as shown below:

Col. 3, line 8: please replace "10. in" with -- 10, in --

Signed and Sealed this

Eighteenth Day of May, 1999

Attest:

Q. TODD DICKINSON

Attesting Officer

Acting Commissioner of Patents and Trademarks